(12) United States Patent
Hammerum

(10) Patent No.: US 10,823,144 B2
(45) Date of Patent: Nov. 3, 2020

(54) METHOD FOR CONTROLLING A WIND TURBINE DURING SAFETY OPERATION

(71) Applicant: VESTAS WIND SYSTEMS A/S, Aarhus N (DK)

(72) Inventor: Keld Hammerum, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 1104 days.

(21) Appl. No.: 14/903,550

(22) PCT Filed: Jun. 26, 2014

(86) PCT No.: PCT/DK2014/050189
§ 371 (c)(1),
(2) Date: May 9, 2016

(87) PCT Pub. No.: WO2015/003710
PCT Pub. Date: Jan. 15, 2015

(65) Prior Publication Data
US 2016/0258416 A1 Sep. 8, 2016

(30) Foreign Application Priority Data
Jul. 8, 2013 (DK) .................................. 2013 70384

(51) Int. Cl.
*F03D 7/02* (2006.01)
*F03D 7/04* (2006.01)

(52) U.S. Cl.
CPC ........... *F03D 7/0264* (2013.01); *F03D 7/024* (2013.01); *F03D 7/0224* (2013.01); *F03D 7/04* (2013.01); *Y02E 10/723* (2013.01)

(58) Field of Classification Search
CPC ...... F03D 7/024; F03D 7/0224; F03D 7/0264; F03D 7/04
See application file for complete search history.

(56) References Cited

U.S. PATENT DOCUMENTS 6,441,507 B1 8/2002 Deering et al.
2008/0290664 A1 11/2008 Kruger
(Continued)

FOREIGN PATENT DOCUMENTS

CN 101248269 A 8/2008
CN 102102630 A 6/2011
(Continued)

OTHER PUBLICATIONS

International Search Report for PCT/DK2014/050189, dated Sep. 24, 2014.
Danish Search Report for PA 2013070384, dated Feb. 5, 2014.

*Primary Examiner* — Ninh H. Nguyen
*Assistant Examiner* — Aye S Htay
(74) *Attorney, Agent, or Firm* — Patterson + Sheridan, LLP

(57) ABSTRACT

A method for controlling a wind turbine during a safety operation is disclosed. A safety pitch control system is provided to pitch the blades individually at a number of pre-set approximately constant pitch rates including a first pitch rate and a second pitch rate lower than the first pitch rate. In response to a command for initiating the safety operation the blades are pitched towards a feathering position by the safety pitch control system including the blades being pitched according to a safety pitch strategy wherein for all the blades the pitch rate is changed between the first pitch rate and the second pitch rate according to a function of each blade azimuthal position. This is done such that each blade in turn is closer to the feathering position than the others.

13 Claims, 7 Drawing Sheets

(56) References Cited

U.S. PATENT DOCUMENTS

| | | | |
|---|---|---|---|
| 2009/0148286 A1 | 6/2009 | Kammer et al. | |
| 2011/0142630 A1 | 6/2011 | Hayashi | |
| 2011/0142634 A1* | 6/2011 | Menke | F03D 7/0224 416/46 |
| 2011/0193343 A1 | 8/2011 | Nakashima et al. | |
| 2011/0280725 A1* | 11/2011 | Taylor | F03D 7/0224 416/1 |
| 2012/0087792 A1* | 4/2012 | Cousineau | F03D 7/0224 416/1 |
| 2012/0139240 A1* | 6/2012 | Otamendi Claramunt | F03D 7/0224 290/44 |
| 2013/0045098 A1 | 2/2013 | Taylor | |
| 2014/0334927 A1* | 11/2014 | Hammerum | F03D 7/0224 416/1 |
| 2016/0032890 A1* | 2/2016 | Hammerum | |

FOREIGN PATENT DOCUMENTS

| | | |
|---|---|---|
| CN | 201991694 U | 9/2011 |
| CN | 102777318 A | 11/2012 |
| CN | 102966488 A | 3/2013 |
| EP | 1788237 A2 | 5/2007 |
| EP | 2067988 A2 | 6/2009 |
| EP | 2211055 A1 | 7/2010 |
| WO | 2013060013 A1 | 5/2013 |
| WO | 2013075720 A2 | 5/2013 |

* cited by examiner

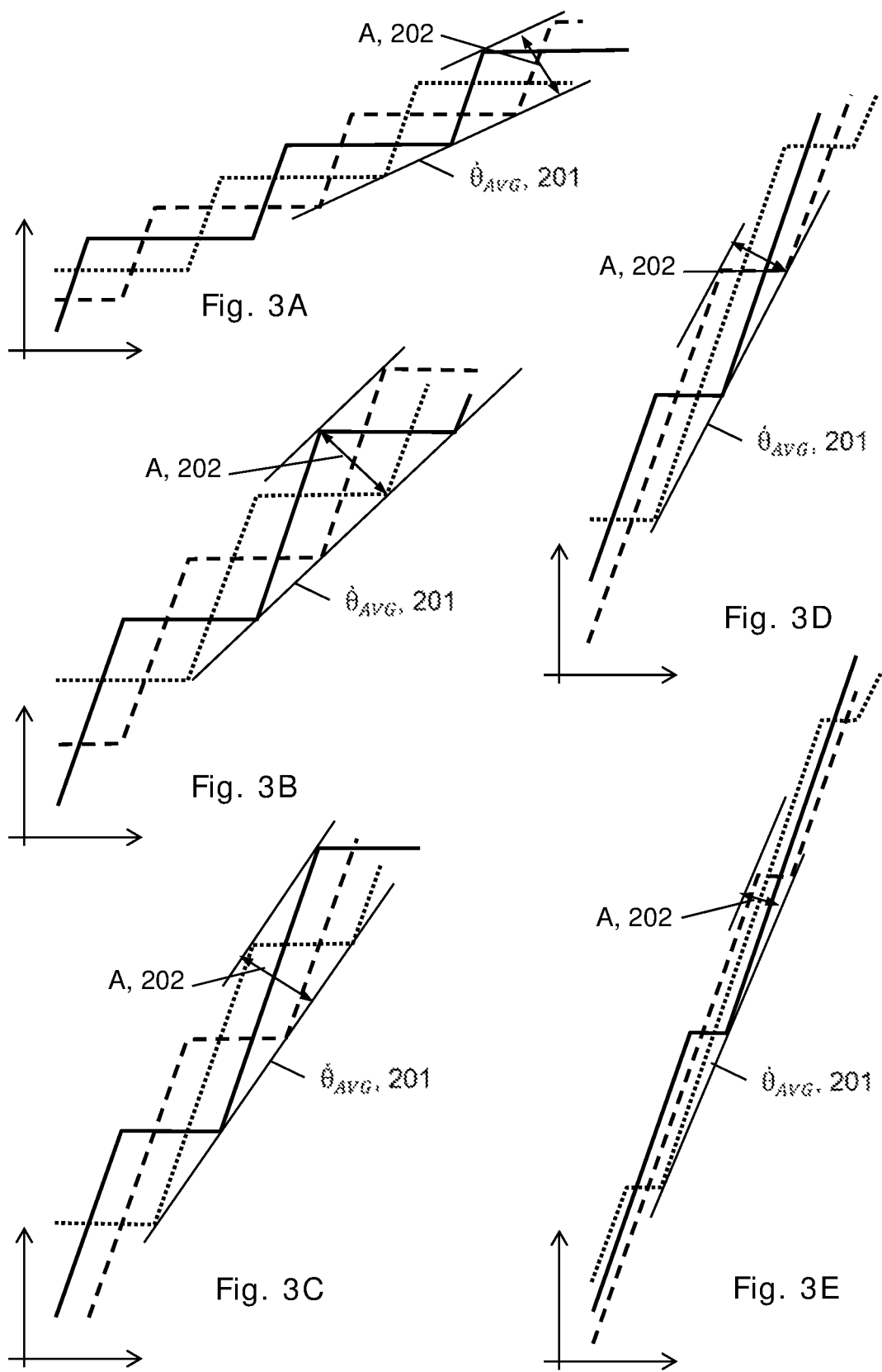

METHOD FOR CONTROLLING A WIND TURBINE DURING SAFETY OPERATION

FIELD OF THE INVENTION

The present invention relates to a method for controlling a wind turbine during safety operation, where the wind turbine comprises wind turbine blades adapted to be pitched individually. More particularly, the method of the invention reduces loads on the wind turbine blades during the shutdown. The invention further relates to a control unit adapted to perform the method, and to a wind turbine comprising such a control unit.

BACKGROUND OF THE INVENTION

In pitch controlled wind turbines, the pitch of the wind turbine blades is adjusted in response to the wind conditions, and in order to obtain a desired energy production. As the wind turbine blades rotate during operation, the loads on each wind turbine blade changes, e.g. due to wind shear, tower passage, turbulence, etc. This may cause asymmetric load distribution among the wind turbine blades. This is undesirable, since it leads to high loads on the rotor, the drive train, etc. In order to avoid this, an individual pitch control strategy is sometimes used. According to an individual pitch control strategy, the pitch angles of the individual blades are adjusted in order to take conditions at the position of each blade into account.

When a halt command or shutdown command is generated for a pitch controlled wind turbine and a safety operation is initiated, e.g. due to an emergency situation, the wind turbine blades are normally moved towards a feathered position, i.e. their pitch angles are changed until the wind turbine blades are in a position where they no longer catch the wind. It is often desirable to move the wind turbine blades as quickly as possible to the feathered position.

However, in the case of wind turbines in which the wind turbine blades are pitched individually, the pitch angles of the wind turbine blades are not identical when the halt command or shutdown command is received. On the contrary, the pitch angle of each wind turbine blade has been adjusted in such a manner that it takes the conditions prevailing at the exact position of the blade in question into account. If all the wind turbine blades are simply moved as quickly as possible towards the feathered position when the halt command or shutdown command is received, the mutual differences in the pitch angles will remain as the wind turbine blades continue rotation in the rotor plane, while moving towards the feathered position. Thereby the wind turbine blades are moved away from the positions which dictated the adjustments in the pitch angles, but the adjustments are not altered. This may lead to asymmetric loads on the wind turbine blades which are even worse than would be the case if the pitch angles of the wind turbine blades were simply identical. It may therefore desirable to provide a control strategy during shutdown of an individually pitched wind turbine, which reduces the asymmetric load on the wind turbine blades.

Furthermore, during a shutdown as described above, loads are introduced on the tower of the wind turbine. These loads are not necessarily reduced, and may even be increased, if the shutdown is performed in a manner which reduces the asymmetric load on the wind turbine blades. In order to address this, other shutdown strategies could be applied which reduce the loads on the tower. However, such shutdown strategies may increase the asymmetric loads on the wind turbine blades.

Upon shutdown, the normal blade pitch system is deactivated and a safety pitch system takes over the control of the pitching of the blades. Safety pitch systems are most often kept relatively simple with the priority on being robust and reliable and do in general provide far more limited control functionalities of the blades. In most accumulator based safety pitch systems for example, the pitching of the blades can only be performed at a given speed, or in some systems either at a high pitch rate or a low pitch rate. This naturally reduces the possible shut down strategies considerably, and the safety pitching is normally limited to a simple alignment of the blades and/or pitching the blades towards the feathering position at one or to different constant pitch rates.

Accordingly, it is desirable to provide a control strategy during shutdown of an individually pitched wind turbine, which takes the asymmetric loads on the blades, as well as the loads on the tower into consideration.

DESCRIPTION OF THE INVENTION

It is an object of embodiments of the invention to provide a method for controlling an individually pitched wind turbine during shutdown, wherein asymmetric loads on the wind turbine blades are reduced.

It is a further object of embodiments of the invention to provide a method for controlling a wind turbine during shutdown, in which the combined loads on various parts of the wind turbine such as e.g. tower loads are reduced as compared to prior art methods.

According to a first aspect the invention provides a method for controlling a wind turbine during safety operation, said wind turbine comprising at least two wind turbine blades adapted to be pitched individually. The method comprising the steps of:

providing a safety pitch control system adapted to pitch the blades individually at a number of pre-set approximately constant pitch rates including a first pitch rate and a second pitch rate lower than the first pitch rate;

receiving a command for initiating the safety operation of the wind turbine whereupon the blades are pitched towards a feathering position by the safety pitch control system;

pitching the blades according to a safety pitch strategy wherein the pitch rate of each blade is changed at intervals between the first pitch rate and the second pitch rate such that each blade in turn is closer to the feathering position than the others, and the safety pitch strategy being performed while pitching the blades towards a feathering position.

In the present context the term 'adapted to be pitched individually' should be interpreted to mean a wind turbine in which the pitch angle of each of the wind turbine blades is adjusted individually, for example to take the conditions prevailing at the exact position of each wind turbine blade into account, to reduce the asymmetric loads on the wind turbine blades e.g. due to wind shear, etc. A wind turbine in which the wind turbine blades are adapted to be pitched individually is sometimes referred to as an individually pitched wind turbine. The wind turbine comprises at least two wind turbine blades adapted to be pitched individually. In general, the wind turbine may comprise more blades adapted to be pitched individually. In particularly may the wind turbine comprise three blades adapted to be pitched individually.

According to the method of the invention, a command for initiating the safety operation of the wind turbine is initially received. This command may indicate that operation of the wind turbine is to be stopped or the operation of the turbine is to be continued in a safe mode of reduced power production. The command may, e.g., be generated in response to a detected emergency situation, such as failure or malfunction of a component of the wind turbine, a temperature measured in the wind turbine being out of range, or any other suitable situation which requires that operation of the wind turbine is discontinued. Alternatively or additionally, the safety operation command may be generated in response to measured environmental conditions, such as wind speed, humidity, air density, etc. being outside the operating range of the wind turbine. In any event, when a safety operation command is received, it is normally desirable to pitch the blades towards a feathering position as fast as possible and potentially completely stop the wind turbine.

When the command for safety operation has been received, the blades are pitched towards a feathering position by the safety pitch control system.

In the present context the term moving or pitching the wind turbine blades towards a feathered position should be interpreted to mean changing the pitch angles of the wind turbine blades in such a manner that the pitch angle is changed to a position where the resulting rotational moment on the rotor is reduced, preferably to zero, or at least to a level giving rise only to a small rotational moment. Typically reference to the feathered position of a wind turbine blade means a selected pre-set angle in the range of 85° to 120° in dependence on the mechanical design of the pitch system. The specific feathered position of a wind turbine is a design choice. Nevertheless the term is well-defined to the skilled person, and a turbine normally operates with one or only a limited number of feathered positions, defined by the mechanical design of the pitch system. By moving or pitching the wind turbine blades towards a feathered position the pitch angles of the wind turbine blades is changed in such a manner that the pitch angles in general over some time become closer to the feathered position (of the specific wind turbine). The pitching of a blade towards a feathering position may involve pitching the blade with a negative pitch rate for some shorter period of time as long as the average pitch rate over a longer period of time is positive. Thus, the movement is a rotational movement about a longitudinal axis of each of the wind turbine blade.

The safety pitch control system is adapted to pitch the blades individually at a number of pre-set approximately constant pitch rates including a first pitch rate and a second pitch rate lower than the first pitch rate. The safety pitch control system may e.g. be accumulator powered where the blade pitching is provided by accumulators such as hydraulic accumulators. Here, the accumulators are arranged to provide the pressure to operate the valves controlling the speed of the pitch cylinders. The valves may thus be arranged to yield both negative and positive pitch rates while powered by the accumulators. The valves may be adapted to make the pitch cylinders operate at for example two different piston speeds providing two different pitch rates of the blades. In the present context the term 'approximately constant pitch rates' should be understood as pitch rates which are fixed within a certain deviation in the order of 0.1-5%. Such deviations or approximately constant pitch rates may be the result of gradually slowly falling pressure in the accumulators and/or caused by the change in angle of the extent of the pitch cylinders during the pitching. The safety pitch control system may also be based on an electrical pitch system which uses electric motors for pitching the blades.

In an embodiment, the first pitch rate is of the range of 3 to 10 degrees per second such as approximately 5 or 8 degrees per second. The second pitch rate may be in the range of −10 to +5 degrees per second. In an embodiment, the second pitch rate is of the range of 0.0-5.0 degrees per second such as approximately 2 degrees per second. The second pitch rate may thus in one embodiment be zero or approximately zero.

The method further comprises pitching the blades according to a safety pitch strategy wherein for all the blades, the pitch rate is changed between the first pitch rate and the second pitch rate according to a function of each blade azimuthal position, such that each blade in turn is closer to the feathering position than the others. The safety pitch strategy is performed while pitching the blades towards a feathering position.

I.e. all the blades change between intervals of the first pitch rate and intervals of the second pitch rate, and all the blades change the pitch rate in the same way during a rotational cycle. In this way the pitch rate of each blade is changed periodically with a period equal to a full revolution of the rotor.

I.e. each blade is pitched with alternatingly the first and the second pitch rate depending on their respective azimuthal position. This means that the curves of the pitch rates of all blades are phase-shifted if plotted as a function of time. For a wind turbine with three blades, the curves are shifted corresponding to a third of the period of rotation.

The azimuthal position of each blade may be determined in different ways. In one embodiment, the azimuthal position as a function of time may be determined from the rotational speed of the turbine rotor and an azimuthal position of one of the blades at a given time. Naturally, knowing one azimuthal position of one blade directly gives the azimuthal positions of the other blades. Additionally or alternatively, the azimuthal position can be measured directly. The azimuthal positions may be determined continuously or at regular or irregular intervals during the safety pitching, or may e.g. be determined at the onset or initiation of the safety pitching operation or the onset of the safety pitch strategy and kept track on thereafter from the knowledge of, or an estimate of, the rotational speed.

By changing the pitch rate of each blade such that each blade in turn is the closest to the feathering position according to the method is obtained a cyclic or periodic pitching of the blades at the same time as the safety pitch control system pitches all the blades in general towards a feathering position.

By the term 'cyclic' or 'periodic' pitching is in this context meant, that the relative position of the blades changes periodically at least as a function of the rotation or in other words periodically as a function of the azimuthal position. Furthermore the pitching is periodic in phase, as each blade follows the same pitch rate function one after the other at regular angular intervals during the rotation.

The pitching may also be cyclic or periodic in time if the rotational speed and thereby the time of one full revolution of the rotor is constant. If the rotational speed of the rotor is not constant, then the pitching is still cyclic or periodic with respect to the rotor rotation but then not completely cyclic or periodic in time.

As the pitching is periodic or cyclic, the pattern of pitching is repeated every one full rotation of the wind turbine rotor. I.e. each blade attains the same pitch rate every time the blade is in that specific azimuthal position, and after a full rotation each blade will have changed from e.g. being the blade the farthest away from the feathering position, to being the blade the closest to the feathering position of all the blades, and back again after one full period.

By the proposed method of safety pitching is obtained that the blades are pitched independently during the safety operation e.g. to approximate the individual or even cyclic pitch control applied during normal operation and only by pitching the blades at two different pitch rates. Hereby the blade are pitched also during safety operation in a way to reduce or eliminate the asymmetric loads on the wind turbine blades occurring during the revolution of the rotor e.g. due to wind shear. In this way a pitch control such as a harmonic tilt-yaw control may be continued to a certain degree as approximated with discrete pitch rates during safety pitching.

Hereby a simpler and potentially more robust safety pitch control system can be applied to pitch the blades during safety operation while still pitching the blades individually and cyclically to reduce the asymmetric loads on the wind turbine blades. The individual pitching during safety operation can in this way be obtained without the use of the more advanced motor driven pitching systems capable of pitching the blades at continuously varying pitch rates.

Further, the method according to the above is advantageous in being simple and potentially easily implemented on both accumulator powered pitch systems, as well as electrical powered pitch systems.

Further, the invention according to the above provides for a method of pitching the blades towards the feathering position at a desired speed which may be as quickly as possible while on the same time pitching the blades cyclically to reduce the asymmetric loads on the rotor.

The safety pitch strategy may be applied during the entire safety pitch operation from the initiation hereof and until all the blades have reached the feathering position or the safety pitch operation is otherwise stopped for some reason.

In an embodiment of the invention, the safety pitch strategy is applied for a number of periods or for a certain time. Additionally, the safety pitch strategy may be applied a number of times at time intervals during the safety operation, and each time for the same or different periods of time.

The angular or time intervals at which the blade pitch rates are changed may be at regular or irregular time intervals such as at even or uneven time intervals. In other words the blade can attain the first pitch rate at the same, longer, or shorter time intervals than the second pitch rate during one period of rotation. Here and in the following the ratio between the time of the first pitch rate, $t_1$, and the time of the second pitch rate, $t_2$, for one period, $T=t_1+t_2$, is referred to as the duty cycle $DT=t_1/t_2$.

The safety pitch strategy may comprise periods wherein the first blade being the farthest away from the feathering position is pitched at the first pitch rate, and the third blade being the closest to the feathering position is pitched at the second pitch rate. The blade with a pitch angle in between the first and the third blade may be pitched at either the first pitch rate or the second pitch rate. This may be continued until the order of the blades, when ordered according to their pitch angle, has been changed. The first blade which was initially the farthest away from the feathering position has thereby been pitched at the relatively high pitch rate of the safety pitch control system such as to be at least closer to the feathering position, whereas the third blade which was initially the closest to the feathering position has been pitched at the relatively low pitch rate to attain a pitch angle further from the feathering position than the first blade.

When the first blade is pitched the closest to the feathering position may in one embodiment be determined by measuring the blade pitch angles or by comparing the pitch angles of the wind turbine blades or may additionally or alternatively be determined from the pitch rates and pitch angles upon initiation of the period of the cyclic pitch strategy.

It should be noted that in the present context it is assumed that the pitch angle of a wind turbine blade is increased when the pitch angle is changed from an operating position to a feathered position. Thus, in the present context the wind turbine blade having the pitch angle which is closest to the feathered position has the largest pitch angle, and the wind turbine blade having the pitch angle which is furthest away from the feathered position has the smallest pitch angle.

In an embodiment the safety pitch strategy further comprises determining the change in pitch rate for each blade as a function of a target average pitch rate. Hereby the blades are pitched towards feather at a certain speed. In this way it can be controlled how fast the blades are to be moved towards feather during the safety operation. In this way different average pitch rates between the first and the second pitch rates can be obtained even though only the two approximately constant pitch rates are applied for each blade. In other words the pitching according to the invention opens up the possibility of obtaining a range of average pitch rates by the application of only two pre-set pitch rates. This is obtained by determining when each blade should switch between the pitch rates and for how long (in angular movement and/or in time) each pitch rate should be kept.

The average pitch rate and the duty cycle depend on each other. The average pitch rate varies non-linearly between the lower second pitch rate and the higher first pitch rate as the duty cycle varies between 0 and infinity.

In an embodiment the safety pitch strategy further comprises determining the change in pitch rate for each blade as a function of a target amplitude. Hereby the difference in pitch at every given time or any given angular position can be controlled and thereby the amount by which any asymmetric loading on the rotor can be reduced. In this way different pitch amplitudes can be obtained even though only the two approximately constant pitch rates are applied for each blade. In other words the pitching according to the invention opens up the possibility of obtaining a range of pitch amplitudes by the application of only two pre-set pitch rates. Like for the case with the average pitch angle, different pitch amplitudes can be obtained by determining when each blade should switch between the pitch rates and for how long (in angular movement and/or in time) each pitch rate should be kept. The obtainable amplitude varies nonlinearly with the duty cycle. The obtainable amplitude also varies non-linearly with the average pitch rate. In both cases higher pitch amplitudes may be obtained for intermediate values of the duty cycle and average pitch rate.

In an embodiment the safety pitch strategy further comprises estimating a target trajectory of the pitching of the blades during the safety operation based on a superposition of a target average pitch rate of all the blades and a sinusoidal function having a target amplitude and a period corresponding to the rotational speed of the turbine rotor, and wherein the pitching during the safety pitch strategy is determined as a piece-wise linear approximation to the target trajectory. The blades are hereby pitched in a cycle corresponding to a piece-wise linear approximation to a simple harmonic cycle superimposed by a linear increase in the average pitch of the blades. In this way some cyclic independent pitching of the blades is preserved at the same time as a general pitching towards the feathering position.

The target amplitude of the target trajectory may advantageously correspond to or be determined as the pitch amplitude of the individual pitching prior to the safety operation. Hereby the pitching during the safety operation may be approximated the closest to the individual pitching prior to the safety operation thereby optimally reducing the asymmetric loads on the rotor, while on the same time pitching the blades towards a feathering position.

The pitching may e.g. be determined by a linear fitting to the target trajectory. Alternatively, the pitching may be determined by solving an optimization problem with the design variables being the control signals to each of the blades for the first or second pitch rate and the cost function being the goodness of the pitching to the ideal or target trajectory.

The method may be performed without necessarily knowing the azimuthal positions of the blades as the cyclic pitching may simply be performed to be approximately in phase with cyclic pitch motion of the blades prior to the initiation of the safety operation.

In an embodiment of the invention the target average pitch rate is a pre-determined parameter or is determined as a function of one or more operational parameters of the wind turbine from the set of a measure of the rotational speed of the turbine rotor, rotor acceleration, a load on the rotor, the produced power, a measure of the movement of the tower, and a position of the tower. Hereby, the safety pitching can advantageously be controlled according to the operational parameters of the wind turbine upon initiating the safety operation. For example a higher target average pitch rate may advantageously be chosen if the wind turbine is to be stopped or braked as fast as possible, or the target average pitch rate can be chosen such as to reduce the loads acting on the tower while at the same time reducing the asymmetric loads via the periodic pitching.

In an embodiment of the invention the target amplitude is determined based on the rotational speed of the turbine rotor and the pitch difference between the blades upon initiating the safety operation, and/or based on the pitch amplitude before initiating the safety operation.

In an embodiment of the invention, the method further comprises pitching the blades at an identical pitch rate for a first period of time before initiating the safety pitch strategy. Hereby the blades are first pitched collectively thereby primarily acting to reduce the tower loads during the safety operation. Then after the first period of time the cyclic pitching is applied to reduce the asymmetric rotor loads. In this way it is prioritized to first reduce the dominant or most severe loads on the wind turbine.

The blades may be pitched collectively first at the first high pitch rate and then secondly collectively at the second pitch rate. Such pitching can reduce the tower loads by keeping the rotor speed low while avoiding excessive negative thrust on the rotor.

According to an embodiment, this first period of time is determined as a function of one or more operational parameters of the wind turbine from the set of a measure of the rotational speed of the turbine rotor, rotor acceleration, a load on the rotor, a measure of the movement of the tower, and a position of the tower. Hereby may be obtained that the fast pitching of the blades is stopped or slowed down in time to avoid the excessive loads on the tower which may otherwise occur as the tower bends forward into the wind again during the stopping or braking operation. The pitching towards a feathered position is performed as fast as possible upon initiation of the safety operation, thereby braking the turbine as fast as possible. As the pitching speed is anyway preferably reduced after the first period of time, the cyclic pitch strategy is then advantageously applied to reduce the asymmetric loads on the rotor.

According to a further embodiment of the invention, the safety pitch strategy comprises intermediate periods of time wherein the blades are pitched at identical pitch rates. This may be applied with or without an initial first period of time of identical pitch rates to all the blades.

By the intermediate periods of collective pitch of identical pitch rates for all blades are obtained that the average pitch rate resulting from the safety operation can be varied or changed. In that way the blades can be pitched faster towards the feathering position by setting the identical pitch rate equal to the first pitch rate in the intermediate periods of time. Alternatively the feathering can be performed slower by setting the identical pitch rate equal to the second pitch rate.

This method may advantageously be applied if the time needed to change the order of the blades is shorter than the time of a third of a rotor revolution such that there is time enough to also allow the blades to be periodically pitched collectively at identical pitch rates. In other words the individual cyclic pitching scheme is in general given prioritization but the collective scheme of identical pitch rates is advantageously allowed to take control in between if there is time to enough to conduct the required cyclic pitching.

According to an embodiment the safety pitch strategy comprises a first number of intermediate periods of time wherein the blades are all pitched at the first pitch rate, and after a certain time a second number of intermediate periods of time wherein the blades are all pitched at the second pitch rate.

In an embodiment of the invention, this certain time is determined as a function of one or more operational parameters of the wind turbine from the set of a measure of the rotational speed of the turbine rotor, rotor acceleration, a load on the rotor, a measure of the movement of the tower, and a position of the tower.

Hereby the blades are pitched individually with a higher average pitch rate at first and thereafter at a lower average pitch rate. In this way the asymmetric rotor loads are reduced while on the same time changing the average pitch rate from a relatively high to a lower value thereby reducing the loads on the tower caused by the braking.

According to another aspect of the invention a control unit 310 for controlling pitch angles of a wind turbine 300, the wind turbine 300 comprising a rotor 320 carrying at least two wind turbine blades 330 adapted to be pitched individually, the control unit 310 being capable of performing the method according to other aspects of the invention. The invention further relates to a wind turbine 300 comprising a rotor 320 carrying at least two wind turbine blades 330 adapted to be pitched individually, and a control unit 310 according to further aspects of the invention.

BRIEF DESCRIPTION OF THE DRAWINGS

The invention will now be described in further detail with reference to the accompanying drawings in which FIGS. 3A-E are different embodiments of resulting cyclic pitching obtained by two pitch rates and for a fixed period length by varying the duty cycle.

DETAILED DESCRIPTION OF THE DRAWINGS

The present invention generally relates to wind turbines with individually pitched blades. In general two or more blades may be present. Nevertheless, throughout this section a three blades wind turbine is describes. The skilled person is capable of extending the teaching to a wind turbine with a different number of blades.

Figure 1:
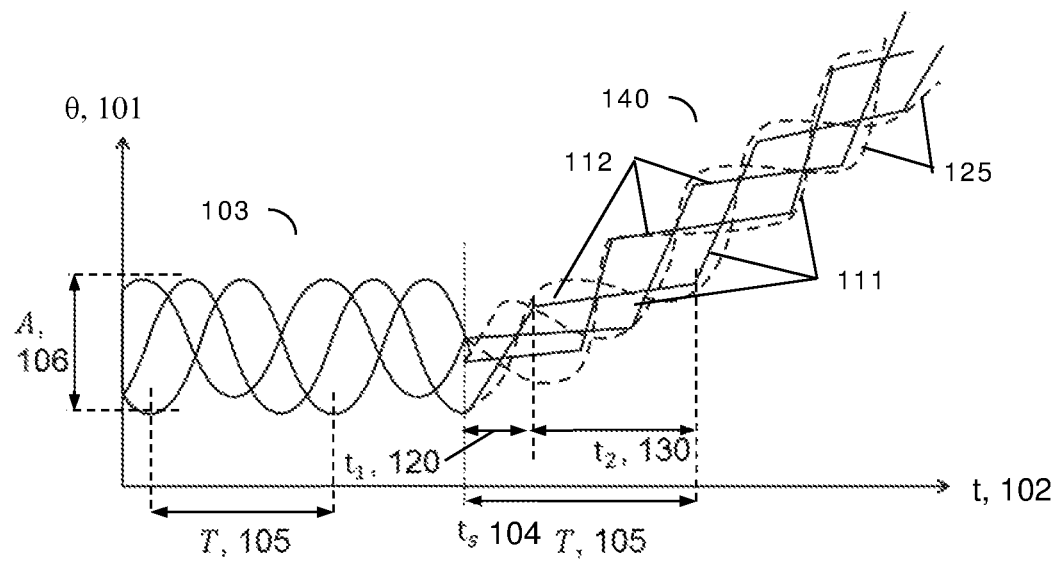
FIG. 1 illustrates the pitch of the wind turbine blades during normal operation and upon initiation of a safety operation in accordance with an embodiment of the invention.

FIG. 1 illustrates sketch-wise the pitch, 101 of each of three wind turbine blades as a function of the time, 102 according to an embodiment of the invention. During normal operation 103 the blades are pitched individually to reduce the asymmetric loads on the rotor. Typically by the application of an individual pitch control wherein each blade is pitched according to the measured loads. In the illustrated embodiment, the blades are pitched to follow phase-shifted harmonic sinusoidal functions with a period T, 105, and a peak-to-peak amplitude A, 106.

A safety operation of the wind turbine is initiated at the time $t_s$, 104 where after a safety control system takes over the pitching of the blades and the safety operation is performed, 140, including pitching the blades towards a feathering position in order to slow down or stop the turbine (not shown).

The safety control system is capable of pitching each of the blades at two distinct pitch rates, a first pitch rate 111 and a lower second pitch rate 112. In the shown example the second pitch rate is near zero such as around 0.1-2 degrees per second. The second pitch rate may in some embodiments be zero. The high pitch rate is typically in the range of 5-15 degrees per second such as around 8-9 degrees per second. Such safety pitching may be obtained for example by an accumulator powered pitch system with two distinct piston speeds.

FIG. 1 further shows the safety pitch strategy wherein the pitch rates of all the blades are changed in the same way as a function of each blades azimuthal position. The pitch of each blade is changed between time or angular intervals, t1, 120, of the first high pitch rate, 111, and intervals, t2, 130, of the second low pitch rate, 112. In this way each blade is pitched such as to in turn be closer to the feathering position than the others. This then yields a cyclic or periodic change in the pitch rate following the rotation of the rotor while at the same time pitching all blades towards a feathering position.

The dotted lines 125 in FIG. 1 indicate the target trajectory or an ideal harmonic pitching superimposed by a gradual increase of the pitch. By the proposed method the target trajectory of the harmonic functions are approximated with a few (in this case and typically two) discrete pitch rates during the safety pitching. Hereby the safety pitch control may determine a target trajectory for the cyclic pitching and—based e.g. on some fitness metric—approximate this trajectory using only the available approximately constant pitch rates.

By the application of this safety pitch strategy as sketched in FIG. 1, the asymmetric rotor loads can be considerably reduced during shutdown or safety operation.

Figure 2A:
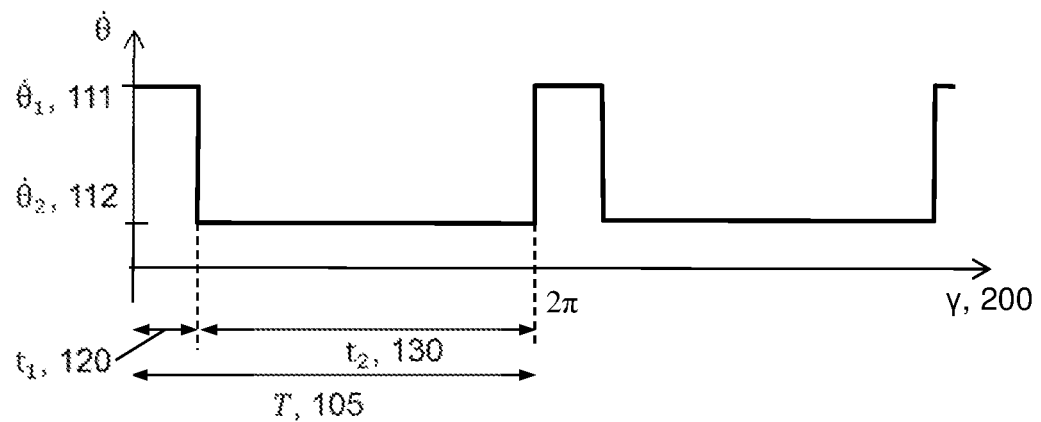
FIGS. 2A-C are graphs illustrating an embodiment of a safety pitch strategy according to the invention, showing the pitch rate for all blades as a function of azimuthal position and time, respectively, and the resulting pitching.
Figure 2B:
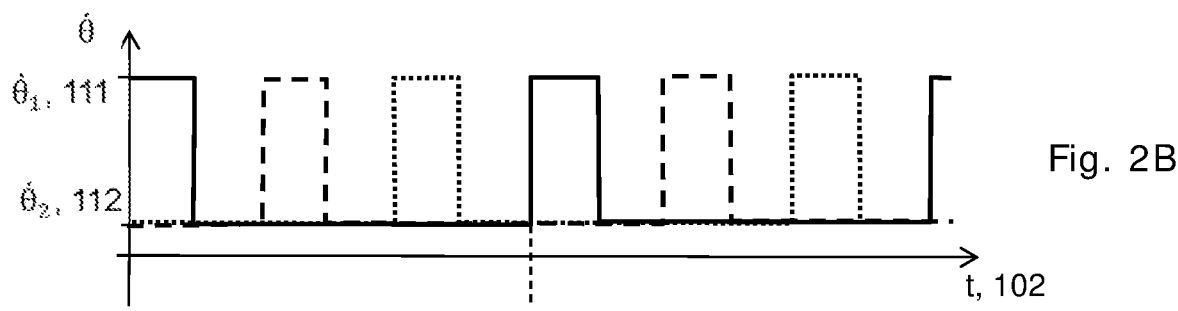
Figure 2C:
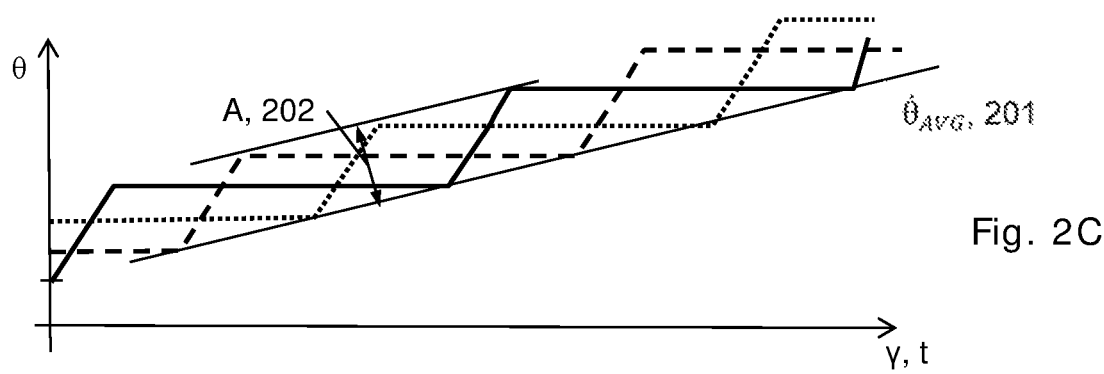

FIGS. 2A-C illustrate an embodiment of the changing of pitch rate of each of the blades during the safety pitch strategy. In FIG. 2A is sketched how the pitch rate of a blade is changed between the first relatively high pitch rate, 111, to the second lower pitch rate 112, and as function of the azimuthal or angular position 200 of the blade. All three blades are pitched according to the same function. As the three blades are one third revolution apart, or in other words at azimuthal positions 120 degrees apart, the pitch rate of all three blades as a function of time becomes as sketched in FIG. 2B. The first pitch rate 111 is set for a first angular interval t1, 120, and the second pitch rate 112 is set for a second angular interval t2, 130, where the sum of the two intervals yields the period T=t1+t2, equal to one full rotation of the rotor. The duty cycle of the pitching is DT=t1/t2=1/5. FIG. 2B shows the pitch rates of all the three blades but as a function of time, yielding three curves shifted in phase.

FIG. 2C shows the resulting pitch θ, 101 of each of the three blades for pitch rate curves as depicted in FIGS. 2A and 2B. As can be seen is obtained a periodic pitching with linearly increasing average pitch angle, 201, and pitch amplitude A, 202.

The sketches in FIGS. 3A-E show different periodic pitching patterns obtained from alternating the pitch rate of each blade according to the invention between a first and a second pitch rate. The embodiments in FIG. 3 all operate with the same first and second pitch rate, and the same period T, 105, but with different increasing duty cycles DT, i.e. increasing time of the first pitch rate relative to the second pitch rate. Changing the duty cycle changes the average pitch rate correspondingly, and also affects the pitch amplitude A 202. The average pitch rate increase with increasing duty cycle. The duty cycles and average pitch angles for the embodiments in the figures are: DT=1/5, θ_avg=1/2 (FIG. 3A), DT=1/2, θ_avg=1 (FIG. 3B), DT=1, θ_avg=3/2 (FIG. 3C), DT=2, θ_avg=2 (FIG. 3D), DT=5/2, θ_avg=5/2 (FIG. 3E). Further it can be seen how the pitch amplitude A, 201, varies with the duty cycle. The largest pitch amplitudes can be obtained from intermediate values of duty cycle and average pitch rate.

Previously, a number of shutdown schemes based on collective pitch have been suggested to also reduce the tower loads during braking of the turbine. One example is shown in FIG. 4.

Here, the blades are first (A) pitched out fast collectively to a certain pitch angle, followed (B) by a more slow pitching towards the feathering position. Such strategy can advantageously reduce the tower loads by keeping the rotor speed low while avoiding an excessive, negative thrust on the rotor.

Figure 5:
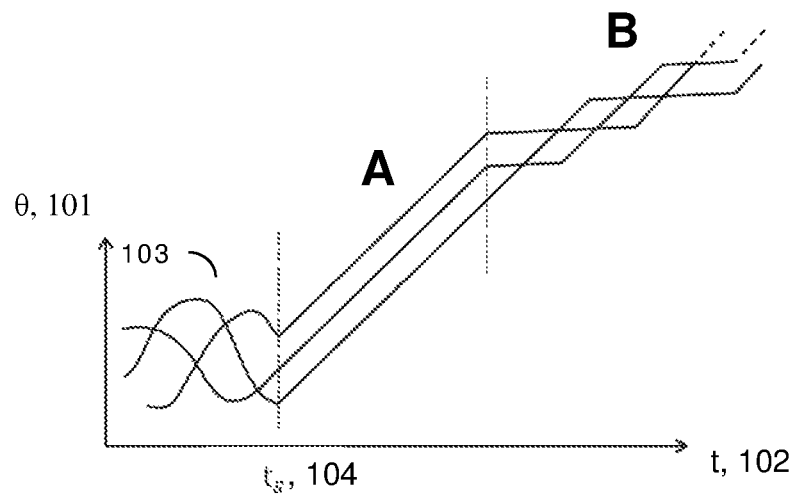
FIG. 5-6 illustrate different embodiments of the pitching during safety operation with periods of identical pitch before and during the cyclic pitching and according to different embodiments of the invention.
Figure 6:
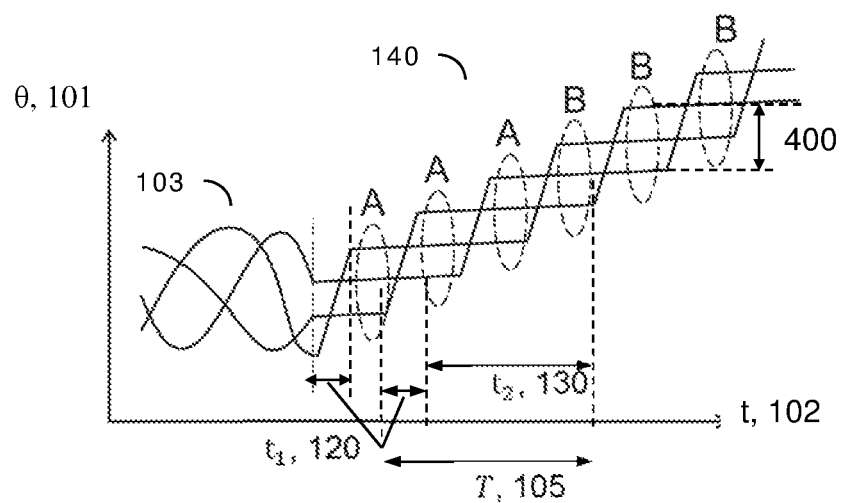
Figure 7:
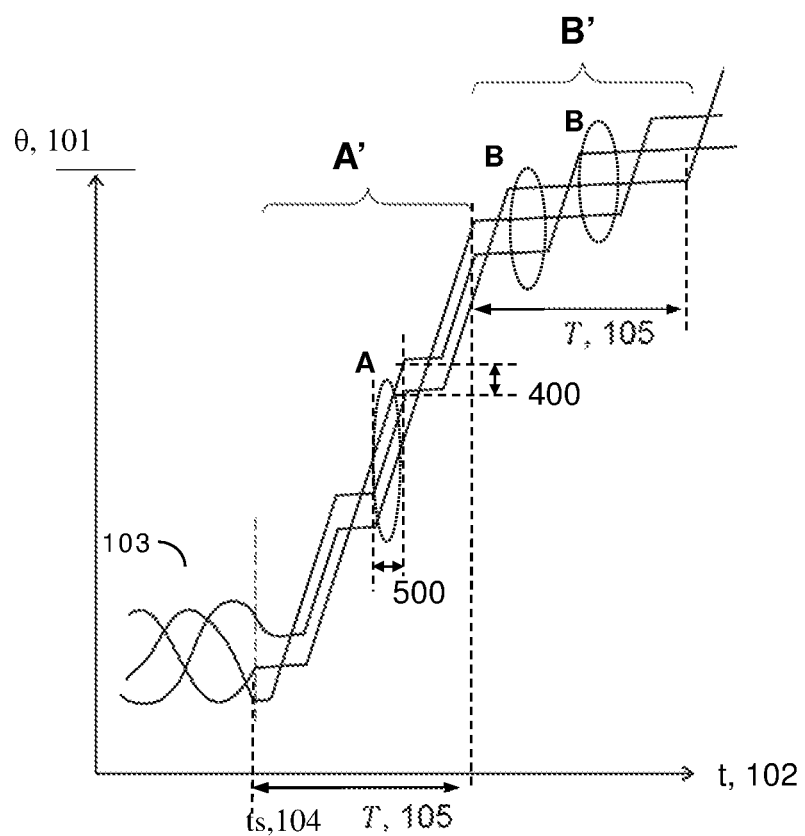
FIG. 7 illustrates an embodiment of the pitching during safety operation with periods of identical pitch during the cyclic pitching according to an embodiment of the invention.

The following FIGS. 5-7 show examples where the two safety pitch strategies are combined and prioritized to thereby harvest some benefits from both.

Figure 4:
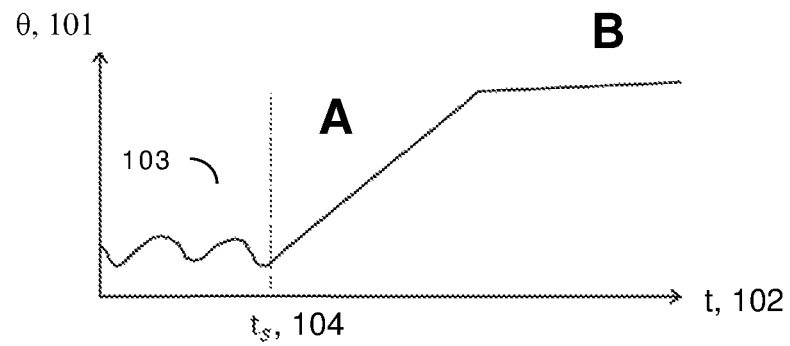
FIG. 4 is a graph illustrating a pitch strategy during shutdown according to prior art.

In the prior art example illustrated in FIG. 4, the collective scheme would aim at pitching all three blades fast in the beginning of the shutdown sequence, whereas the cyclic pitching strategy according to the invention as illustrated in FIG. 1 would apply the fast pitching and the high pitch rate only when in accordance with the target trajectory.

A first example of a combination of the two schemes is illustrated in FIG. 5 and governs a simple prioritization of the two schemes. FIG. 5, illustrates schematically the prioritization wherein a collective pitching strategy is given priority over the individual cyclic pitching strategy for a first period of time, A. As the collective pitch has reached a certain state—e.g. the transition from a high to a lower pitch rate, then the priority is given to the individual cyclic pitching, B, which then in this example governs the rest of the safety operation. In this way the pitching is first performed to reduce the tower loads and then to reduce the asymmetric rotor loads.

FIG. 6 illustrates another embodiment of a combination of periodic pitching according to the safety pitch strategy also comprising intervals of collective pitch. Here, the ability of the pitch system to reach a desired pitch amplitude or pitch difference well within the time of one third revolution is exploited to pitch the blades at identical pitch rates.

As an example, consider a target trajectory for the individual cyclic pitching where a target pitch amplitude of for example 2 degrees is preferably to be reached within 2 seconds. With a difference in pitching rates of, for example 4 degs/s, the desired target pitch amplitude can be reached in half a second. The rest of the time for the cycle of the cyclic pitching to correspond to the revolution of the rotor can be used for any collective pitch action, as long as the target pitch amplitude is reached. This collective pitch action could e.g. include a fast-slow pitch action as outlined in FIG. 4. The overall safety pitch strategy could then be described as: "give the individual cyclic pitching prioritization, but allow collective pitching to take control whenever there is time enough to conduct the required, individual pitching.

This idea is illustrated in FIGS. 6 and 7. In FIG. 6 is shown a safety pitch operation wherein the blades are pitched periodically, and each blade is pitched either a first relatively high pitch rate or at a lower second pitch rate (represented by the almost horizontal lines). As indicated in the figure, the desired pitch difference 400 is reached without utilizing all the available pitch difference capacity, and the pitch rates of the blades are identical in the intermediate intervals one third of the time. These intervals are encircled by dotted lines, A and B. In between these intervals, in the time periods 120, the blades are pitched by moving the first blade from a pitch angle the farthest away from the feathering position to a pitch angle the closest to the feathering position.

In FIG. 7, is shown a similar pitch scheme, with intermediate intervals of identical pitch rates for all the blades. Here the same pitch difference 400 at a time t is obtained, but with collective pitch action being governed by a pitch fast/slow scheme. Here, the region marked A' corresponds to the "A" region in FIG. 4. Thus, the advantages from both pitch schemes of fast/slow pitching to reduce the tower loads and cyclic pitching to reduce the asymmetric rotor loads can be obtained at the same time. In the embodiment shown in FIG. 7, the period T, 105, of the pitching in both the fast A' and the slow B' pitch regions is kept constant. Only the duty cycle is varied thereby changing the average pitch rate and the pitch amplitude correspondingly.

Due to the intermediate intervals of collective or identical high pitch rate in the fast pitch region, A', each blade changes between the first and the second pitch rate more than once during the pitching period T.

Figure 8:
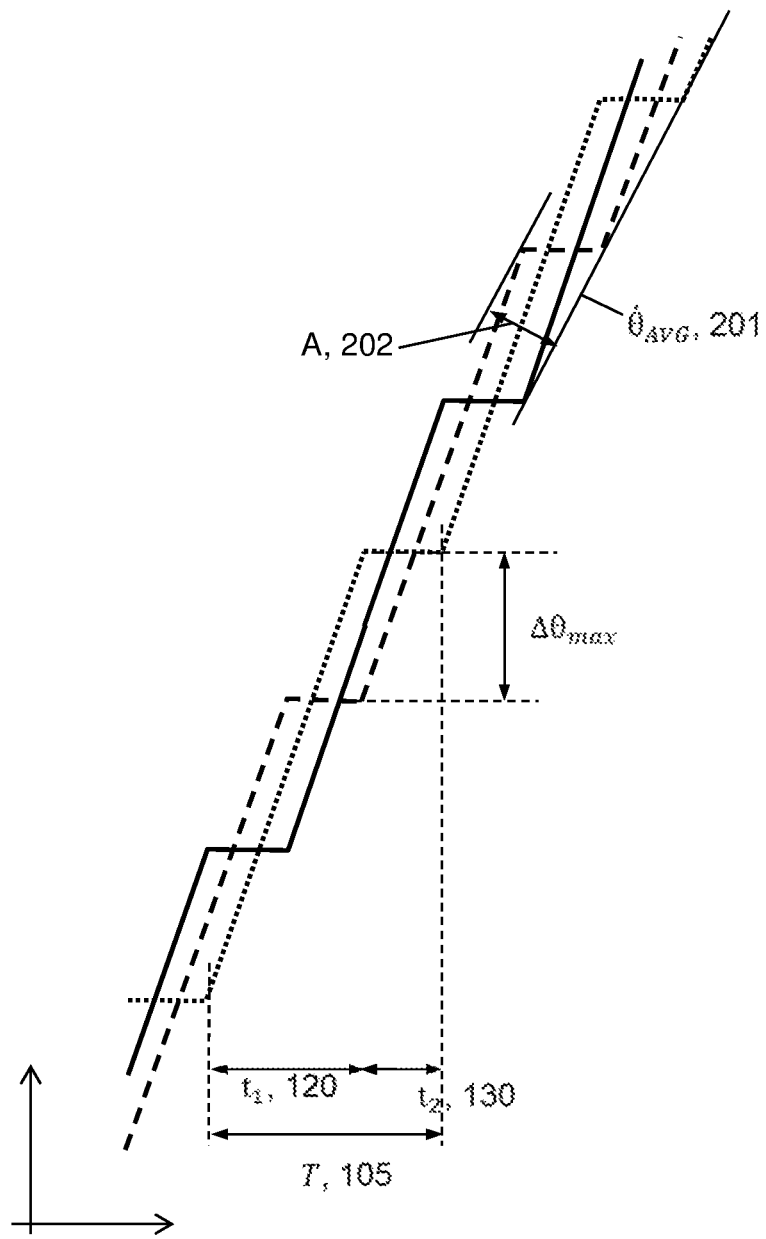
FIG. 8 illustrates an alternative pitching during safety operation with the same period, duty cycle, and average pitch rate as in FIG. 7, and FIG. 9 illustrating a different embodiment of the pitching during safety operation with periods of negative pitch rates during the cyclic pitching.

A periodic pitching with the same period, average pitch rate, and duty cycle can be obtained as an alternative by changing the pitch rate of each blade only one time and back during each period. This is illustrated in FIG. 8. As can be seen the first and second pitch rates, the period T, and the duty cycle is the same as in FIG. 7. Only the sequencing of the pitch rate for each blade is changed, thereby yielding a perhaps more 'simple' periodic pitch pattern with a higher pitch amplitude A, but also a higher pitch difference.

The resulting pitching can thus also be changed and controlled by changing the sequence of the pitch rates during each period.

Figure 9:
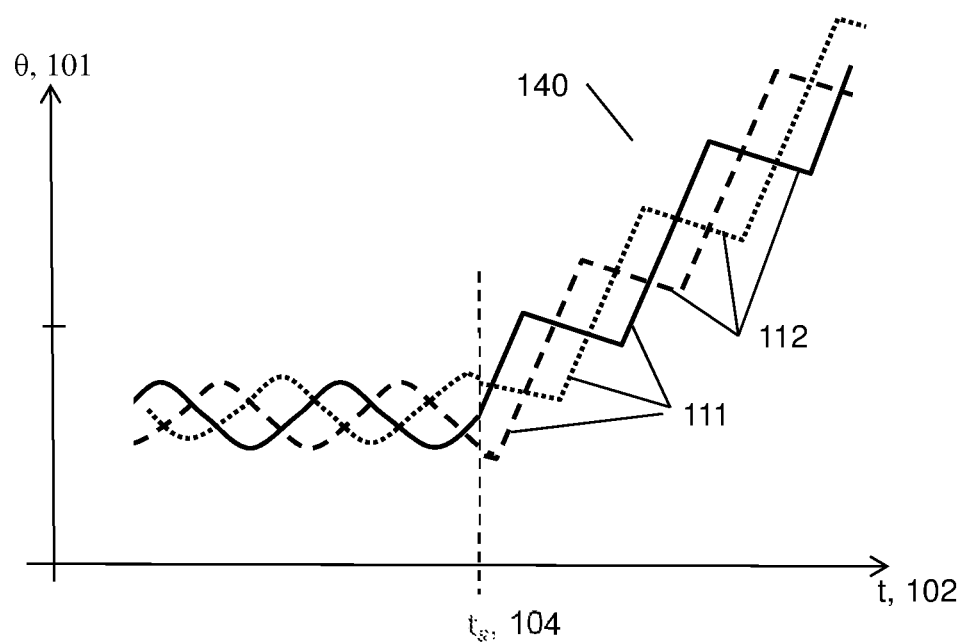
Figure 10:
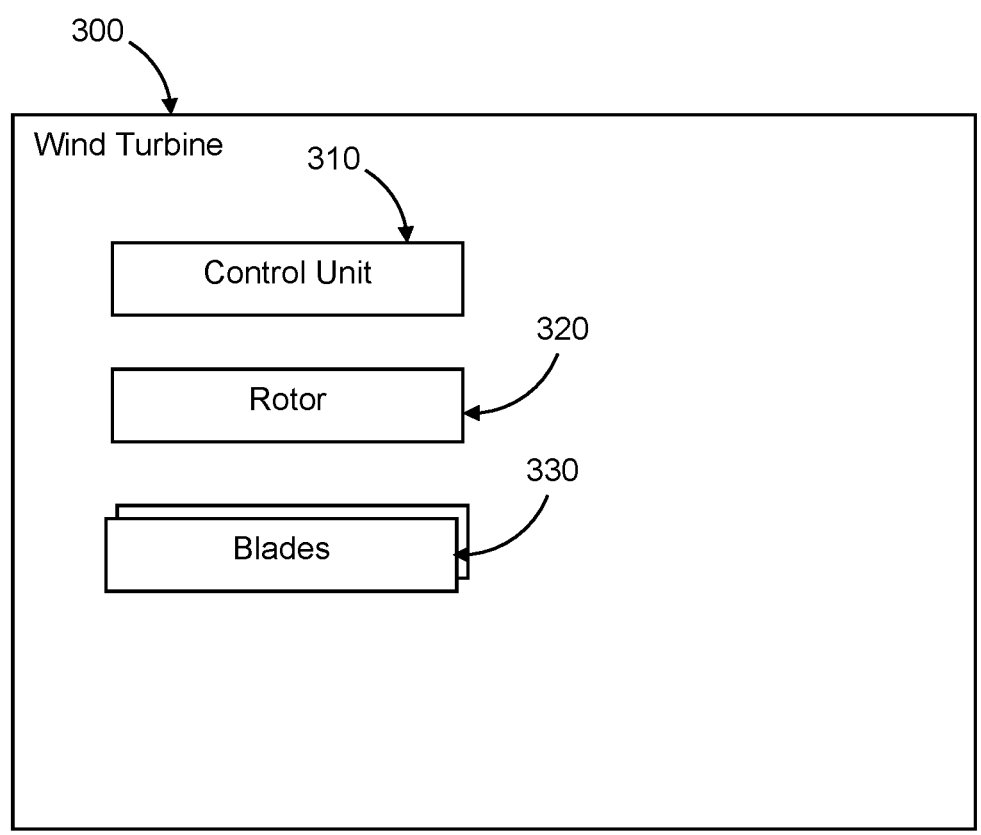
FIG. 10 illustrates a block diagram of the wind turbine according to embodiments of the invention.

In FIG. 9 is shown a further embodiment of the pitching during safety operation showing the pitch 101 of each of the three blades as a function of time 102. At the time $t_s$, 104 the individual pitching of the blades is stopped and the safety operation is performed, 140, wherein the blades are all pitched towards a feathering position.

The safety pitch strategy here involves pitching each blade at a first, 111, and a second pitch rate 112, where the second pitch rate is negative.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

What is claimed is:

1. A method for controlling a wind turbine comprising at least two blades adapted to be pitched individually by a safety pitch control system adapted to pitch the at least two blades at a number of pre-set approximately constant pitch rates, the method comprising:
   receiving a command for initiating a safety operation of the wind turbine; and
   in response to receiving the command:
      during a first period of time:
         controlling a first blade of the at least two blades and a second blade of the at least two blades at different rates of the pre-set approximately constant pitch rates from one another, such that when the first period of time concludes, the first blade is closer to a feathering position than the second blade is;
      during a second period of time after the first period of time:
         controlling the first blade and the second blade at different rates of the pre-set approximately constant pitch rates from one another, such that when the second period of time concludes, the second blade is closer to the feathering position than the first blade is; and
      during a third period of time after the second period of time:
         controlling the first blade and the second blade at different rates of the pre-set approximately constant pitch rates from one another, such that when the third period of time concludes, the first blade has reached the feathering position.

2. The method according to claim 1, further comprising determining a change in pitch rate for each blade as a function of a target average pitch rate.

3. The method according to claim 1, further comprising determining a change in pitch rate for each blade as a function of a target pitch amplitude.

4. The method according to claim 1 comprising estimating a target trajectory of the pitching of the at least two blades during the safety operation based on a superposition of a target average pitch rate of all of the at least two blades and a sinusoidal function having a target pitch amplitude and a period corresponding to a rotational speed of a rotor of the wind turbine, and wherein the pitching during the safety operation is determined as a piece-wise linear approximation to the target trajectory.

5. The method according to claim 2, wherein the target average pitch rate is a pre-determined parameter or is determined as a function of one or more operational parameters of the wind turbine from the set of: rotational speed of a rotor of the wind turbine, rotor acceleration, load on the rotor, produced power of the wind turbine, movement of a tower comprising the wind turbine, and position of the tower.

6. The method according to claim 3, wherein the target pitch amplitude is determined based on at least one of the following set: a rotational speed of a rotor of the wind turbine and a pitch difference between the at least two blades upon initiating the safety operation, and a pitch amplitude before initiating the safety operation.

7. The method according to claim 1, further comprising pitching the at least two blades at an identical pitch rate for an initial period of time before initiating the safety operation.

8. The method according to claim 7, where the initial period of time is determined as a function of one or more operational parameters of the wind turbine from the set of: rotational speed of a rotor of the wind turbine, acceleration of the rotor, load on the rotor, movement of a tower comprising the wind turbine, and position of the tower.

9. The method according to claim 1 wherein the safety operation comprises intermediate periods of time between the first period of time and the second period of time and between the second period of time and the third period of time wherein the first blade and the second blade are pitched at identical pitch rates.

10. The method according to claim 9 wherein the safety operation comprises a first number of intermediate periods of time wherein the at least two blades are all pitched at a first identical pitch rate, and after a certain time a second number of intermediate periods of time wherein the at least two blades are all pitched at a second identical pitch rate.

11. The method according to claim 10, wherein the certain time is determined as a function of one or more operational parameters of the wind turbine from the set of: rotational speed of a rotor of the wind turbine, acceleration of the rotor, load on the rotor, movement of a tower comprising the wind turbine, and position of the tower.

12. A method to control a wind turbine comprising a rotor carrying at least a first blade and a second blade that are adapted to be pitched individually, the method comprising:
identifying a number of pre-set approximately constant pitch rates including a first pitch rate and a second pitch rate less than the first pitch rate; and
in response to receiving a safety operation initiation command, pitching the first blade towards a feathering position at the first pitch rate and the second blade towards the feathering position at the second pitch rate for a first period of time, such that when the first period of time concludes, the first blade is closer to the feathering position than the second blade is;
in response to the first period of time expiring, pitching the first blade towards the feathering position at the second pitch rate and the second blade towards the feathering position at the first pitch rate for a second period of time, such that when the second period of time concludes, the second blade is closer to the feathering position than the first blade is; and
in response to the second period of time expiring, pitching the first blade towards the feathering position at the first pitch rate and the second blade towards the feathering position at the second pitch rate for a third period of time, such that when the third period of time concludes, the first blade is closer to the feathering position than the second blade is.

13. The method of claim 12, wherein the first period of time is less than the second period of time and the second period of time is less than the third period of time, such the wind turbine adjusts the first blade and the second blade towards the feathering position with increasing duty cycles.

* * * * *